US010911292B1

(12) United States Patent
Bshara et al.

(10) Patent No.: US 10,911,292 B1
(45) Date of Patent: Feb. 2, 2021

(54) CONTROLLING PEER-TO-PEER COMMUNICATION

(71) Applicant: Amazon Technologies, Inc., Seattle, WA (US)

(72) Inventors: Nafea Bshara, San Jose, CA (US); Robert Michael Johnson, Austin, TX (US); Asif Khan, Cedar Park, TX (US); Stanislav Spassov, Dresden (DE); Christopher Joseph Pettey, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/637,568

(22) Filed: Jun. 29, 2017

Related U.S. Application Data

(60) Provisional application No. 62/479,188, filed on Mar. 30, 2017.

(51) Int. Cl.
| | | |
|---|---|---|
| *H04L 29/08* | (2006.01) | |
| *H04L 29/00* | (2006.01) | |
| *H04L 12/26* | (2006.01) | |
| *H04M 11/08* | (2006.01) | |
| *G06F 9/00* | (2006.01) | |
| *H04M 11/06* | (2006.01) | |

(52) U.S. Cl.
CPC ............. *H04L 29/08* (2013.01); *H04M 11/06* (2013.01); *G06F 9/00* (2013.01); *H04L 29/00* (2013.01); *H04L 43/00* (2013.01)

(58) Field of Classification Search
CPC ......... H04L 29/08; H04L 29/00; H04L 43/00; H04M 11/06; G06F 9/00
See application file for complete search history.

(56) References Cited

U.S. PATENT DOCUMENTS

| | | | |
|---|---|---|---|
| 9,996,484 B1* | 6/2018 | Davis | G06F 13/105 |
| 2006/0179195 A1* | 8/2006 | Sharma | G06F 9/5077 |
| | | | 710/123 |
| 2006/0206655 A1* | 9/2006 | Chappell | G06F 13/4027 |
| | | | 710/315 |
| 2013/0346655 A1* | 12/2013 | Glaser | G06F 13/385 |
| | | | 710/105 |
| 2016/0299860 A1* | 10/2016 | Harriman | G06F 13/4068 |
| 2017/0017609 A1* | 1/2017 | Menachem | G06F 15/17331 |
| 2018/0137074 A1* | 5/2018 | Sethi | G06F 13/40 |

OTHER PUBLICATIONS

U.S. Appl. No. 15/279,232, filed Sep. 28, 2016, Titled: Configurable Logic Platform.

* cited by examiner

*Primary Examiner* — Shirley X Zhang
(74) *Attorney, Agent, or Firm* — Kilpatrick Townsend & Stockton LLP

(57) ABSTRACT

Access control is provided for peer-to-peer communication between a source peripheral device and a destination peripheral device without going through a host device. The access control mechanism can allow or block a request for a transaction to go out via a port of the source peripheral device to the destination peripheral device by comparing an attribute associated with the transaction with a filter attribute stored in memory. Embodiments of the disclosed technologies can allow programming of different filter attributes for different tenants in a multi-tenant environment.

19 Claims, 8 Drawing Sheets

CONTROLLING PEER-TO-PEER COMMUNICATION

CROSS-REFERENCE TO RELATED APPLICATIONS

This application is non-provisional and claims priority to U.S. Provisional Application No. 62/479,188, filed Mar. 30, 2017, entitled "Controlling Peer-to-Peer Communication," which is incorporated herein by reference in its entirety for all purposes.

BACKGROUND

Computing systems generally include peripheral devices for different functionalities. In some instances, it may be desirable to enable peer-to-peer communication among the peripheral devices coupled to a computing system. For example, the peripheral devices may share some resources among one another. However, in some instances, it may not be desirable to have access to certain functions or memory sections of a peripheral device by another peripheral device. For example, in a cloud environment, allowing a user access to certain sections of the peripheral device can increase the risk of security and privacy issues within the computing system.

BRIEF DESCRIPTION OF THE DRAWINGS

Various embodiments in accordance with the present disclosure will be described with reference to the drawings, in which.

DETAILED DESCRIPTION

Figure 1:
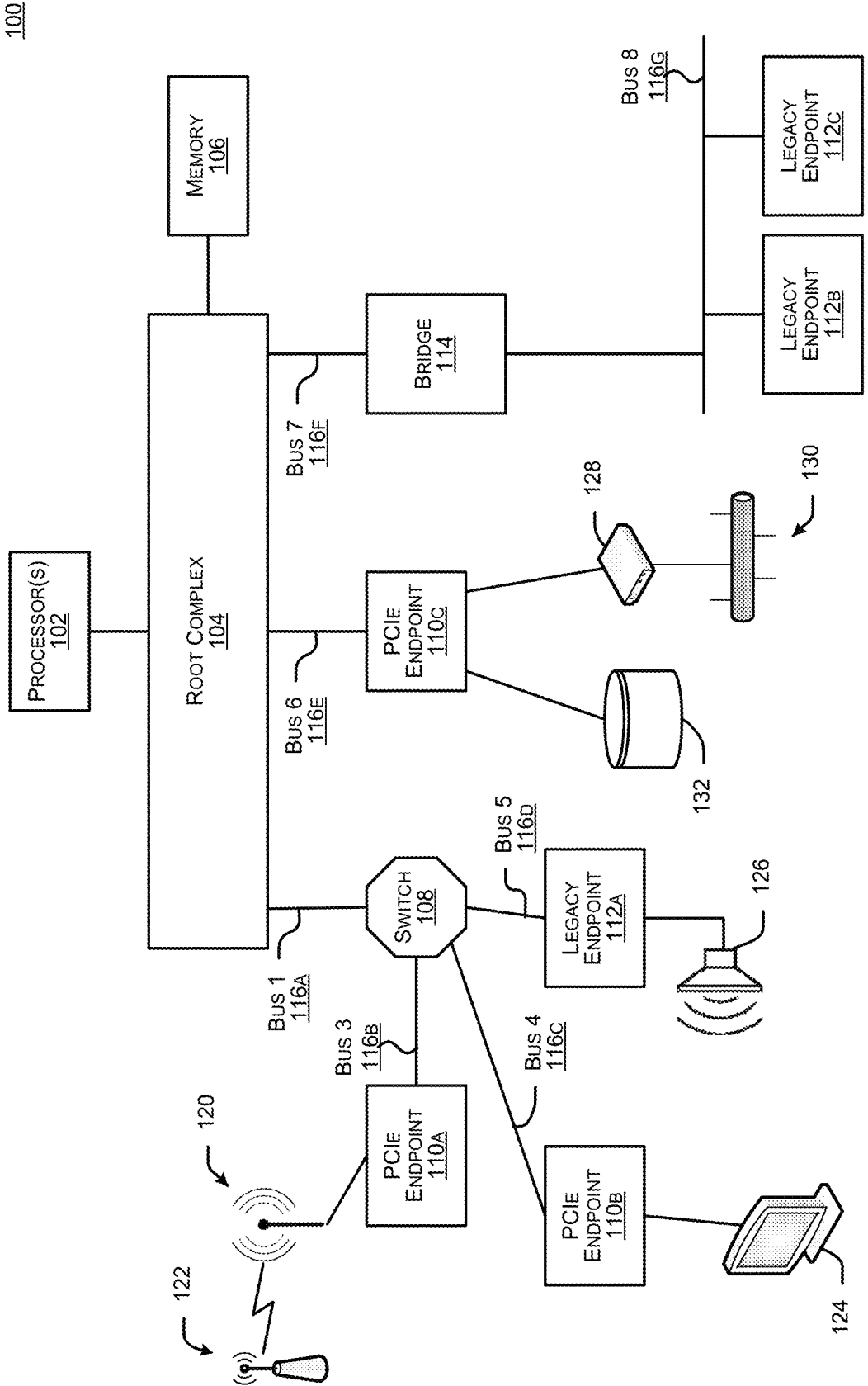
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems generally include peripheral devices. A peripheral device is a device that can extend, adapt, and/or modify the functionality of the computing system. For example, peripheral devices may provide storage, network connectivity, and/or audio and video support to a computing system. Peripheral devices may be connected to a host device in a computing system internally or externally, and can typically communicate with the host device through one or more busses. The manner in which data is transferred on a bus is typically defined by a bus protocol. Examples of bus protocols can include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others. A bus or device that uses a protocol from among the PCI family of protocols may be referred to herein as a PCI-based bus or device. A PCI based peripheral device may implement multiple functions. For example, each function may be an addressable entity in the PCI express configuration space. A function may include a physical function (PF) or a virtual function (VF). Each of the physical functions and/or virtual functions may be assigned to a respective thread of execution (such as for example, a virtual machine) running on the host device.

In some computing systems, it may be desirable for one peripheral device to be able to use the resources of another peripheral device. For example, a PCI-based peripheral device may include a graphics processing unit (GPU). A GPU is an integrated circuit device designed to perform rapid mathematical calculations, generally executing multiple calculations in parallel. GPUs can be used for rendering computer graphics, as well as for other computationally heavy operations, such as financial modeling, weather modeling, and scientific research. In many cases, a computing system may include multiple PCI devices, each hosting a GPU. In such systems, mathematical operations can be executed on multiple GPUs in parallel. When multiple GPUs are operating on the same data, one GPU may need access to the memory of another GPU to, for example, provide computational results or to obtain computational results. Some examples may include peripheral devices with massively parallel computation capabilities, implemented, for example, using one or more field programmable gate arrays (FPGA). Other examples of sharing resources can include networking applications, where a network interface card may transmit transactions directly to another network card, or storage applications, where one storage interface card may read and write directly to another storage interface card. Another example may include network security applications, where one encryption card can encrypt data on a different encryption card.

Generally, when a peripheral device uses the resources of another peripheral device, the peripheral devices use a peer-to-peer communication system. "Peer-to-peer" generally describes a distributed architecture where tasks are partitioned between "peers" in a system. In at least some cases, peers are equally privileged and equal participants in a system, in contrast to a client-server system, where the consumption and supply of resources is divided between the server (e.g., the consumer) and the client (e.g., the supplier). In a peer-to-peer system, the peers generally make at least a portion of their resources—such as processing power, disk storage, memory, and/or network bandwidth—directly available to other peers, without the need for central coordination by a host processor.

In a cloud environment, a user or a customer may have access to certain programmable components of a peripheral device. For example, in some instances, a computing system may include add-in cards that can include FPGAs or GPUs which can allow a user to program certain configurable logic in the FPGA or the GPU. Configurable logic may include hardware that can be programmed or configured to perform a logic function that can be specified by configuration data that is applied to or loaded on the configurable logic. However, allowing user access can potentially introduce security and privacy issues within the system. In some instances, a user may have enough control through programming to issue an address from a source peripheral device that may correspond to a protected addressable section in a target peripheral device. For example, the protected addressable section may correspond to a physical function, a virtual function, or a base address register (BAR). As another specific example, a faulty or malicious design from one user could potentially corrupt or read data from another user if the configured logic is able to read and/or write memory of the other user's memory space. Therefore, it is not desirable to allow unfettered communication between peer peripheral devices that can allow unauthorized access to certain functions, base address registers (BARs) or other protected memory space in the target peripheral device.

In some computing systems, access control can be implemented to regulate access to a resource of a peripheral device. For example, in some implementations, it may be possible to provide access control between peer peripheral devices by routing transactions through the host device (e.g., input/output memory management unit (IOMMU)). However, routing the transactions through the host device may result in increased latency and lower bandwidth for peer-to-peer communications. Furthermore, such re-routing high bandwidth applications through the host device may also result in decreased performance and increase in power usage of the host device.

In some implementations, access control in the PCIe based peripheral devices is implemented at the port level of the peripheral device. For example, a PCIe based peripheral device can deny an incoming request at the port level. However, for peer-to-peer transactions, a receiving peripheral device may not be able to identify the source of the request using a source identifier in order to deny the request at the port level. For example, the request may have been received at the destination peripheral device through a root complex or a PCIe switch device.

Embodiments of the disclosed technologies can provide access control to allow or block a request for a peer-to-peer transaction between a source peripheral device and a destination peripheral device based on an attribute associated with the transaction. For example, the attribute associated with the transaction may include an address, a type of the transaction, a quality of service (QoS) attribute, a tag, or any other attribute associated with the transaction. In some embodiments, the attribute associated with the transaction can be compared with a filter attribute stored in memory. The memory used for storing the attribute may be implemented in software or hardware (e.g. using registers). Based on the comparison, the embodiments can allow or block the transaction with the destination peripheral device without going through the host device.

Some embodiments of the disclosed technologies can provide access control at the source peripheral device to allow or block a request for a transaction with a destination peripheral device based on an address of the request. In some embodiments, the address of the request can be compared with one or more address ranges stored in a memory. For example, the address ranges may be stored in address filter registers or in software using memory. The access control mechanism may be part of the source peripheral device, or another device that may be external to the source peripheral device. In some embodiments, the access control may be part of a switch device that may be communicatively coupled to the source peripheral device and the destination peripheral device. In another embodiment, the access control may be part of an intermediary device that may be located between the source peripheral device and the switch device. The embodiments of the disclosed technologies can provide access control for peer-to-peer communications without going through the host device. Thus, the embodiments can provide fine grained access control to specific address ranges and prevent unauthorized accesses to functions, BARs or protected memory spaces associated with a peripheral device without adversely affecting the host traffic or performance. Some embodiments can provide access control for each tenant in a multi-tenant environment by configuring different address ranges for different tenants using the same peripheral device.

FIG. 1 illustrates an example of a computing system 100 that includes multiple peripheral devices. Peripheral devices can include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 1 can also include peripheral devices that implement bus protocols that are based on a PCI bus protocol, such as Non-Volatile Memory Express (NVMe), a bus protocol used for high-speed storage disks that operates on top of a PCIe bus.

In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-110c and legacy endpoints 112a-112c. The processors 102 may be general purpose computing devices such as are manufactured by Intel®, AMD® ARM®, Qualcomm®, and others. The processors 102 are hardware devices that can be implemented using an integrated circuit or a combination of integrated circuits. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computing system 100, such as a hot plug controller, a power management controller, an interrupt controller, and/or error detection and reporting. In some implementations, the root complex 104 may be implemented as part of a host system that includes one or more integrated processors. In some cases, memory may also be integrated into the host system.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example, Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 110a-110b and the legacy endpoint 112a, and between the various endpoints 110a-110b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112b-112c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110a-110c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-110b and the legacy endpoint 112a are also connected to the switch 108 with individual busses 116b-116d. The connections between each of the root complex 104, the switch 108, the bridge 114, the PCIe endpoints 110a-110c and the legacy endpoint 112a are point-to-point because each of the busses 116a-116g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 116a (Bus 0 may be internal to the root complex 104). Similarly, each of the busses connecting the PCIe endpoints 110a-110b and the legacy endpoint 112a to the switch 108 are labeled Bus 3 116b, Bus 4 116c, and Bus 5 116d, respectively (Bus 2 may be internal to the switch 108).

Furthermore, the connection between the root complex 104 and the PCIe endpoint 110*c* may be labeled Bus 6 116*e*, while the connection between the root complex and the bridge 114 may be labeled Bus 7 116*f*. Finally, the shared bus downstream from the bridge 114 may be labeled Bus 8 116*g*. In most cases, the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110*a* may implement a Wi-Fi adapter 120. Using the Wi-Fi adapter 120, the computing system 100 may be able to communicate wirelessly with a wireless access point 122, and thereby access a network. As another example, another PCIe endpoint 110*b* may implement a video card. A video card may include a port to connect a monitor 124 or other display device. As a further example, the computing system 100 may include a legacy endpoint 112*a* that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110*c* may include an Ethernet adapter, and provide a connection to a gateway device 128, such as a DSL or cable modem. The PCIe endpoint 110*c* may also include a storage adapter, and provide a connection to a storage device 132. The one PCIe endpoint 110*c* thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example, by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110*c* may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116*a*, 116*e*, 116*f* connected to the root complex 104, and identify the switch 108, the PCIe endpoint 110*c*, and the bridge 114. Upon discovering the switch 108, the processors 102 may next scan the busses 116*b*-116*d* connected to the switch 108. The processors 102 thereby discover the PCIe endpoints 110*a*-110*c* and the legacy endpoint 112*a*. Upon discovering the bridge 114, the processors 102 may also scan Bus 8 116*g*; however, the bridge 114 may translate the scanning instructions to the protocol implemented by Bus 8 116*g*.

While scanning the busses, or possibly after, the processors 102 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110*c* may include a configuration register that indicates that it has two functions. The PCIe endpoint 110*c* may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
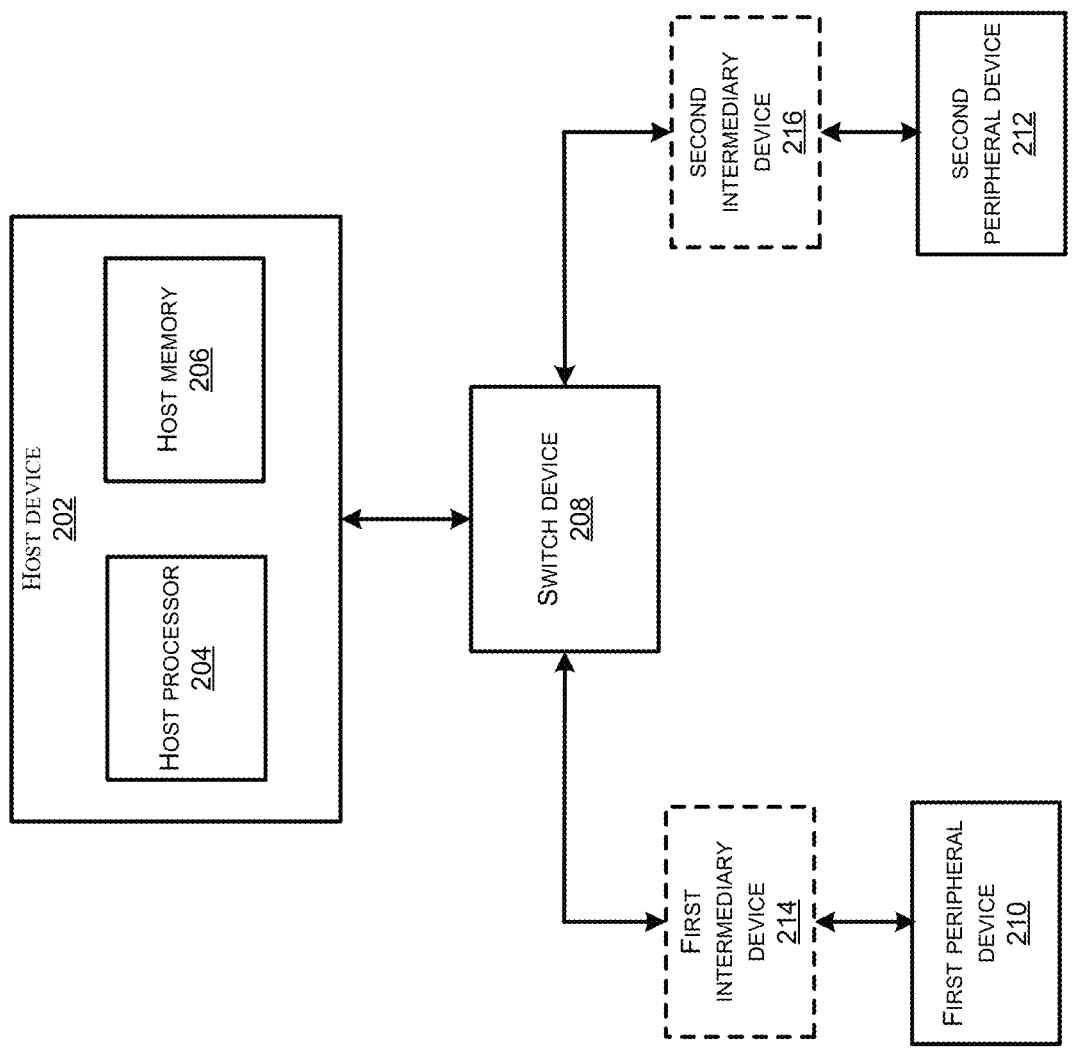
FIG. 2 illustrates a computing system in accordance with an embodiment of the disclosed technologies.

FIG. 2 illustrates a computing system 200 in accordance with an embodiment of the disclosed technologies. In some implementations, the computing system 200 may be part of a server computer. For example, server computers can provide services such as cloud computing, analytics, web services, storage, databases, applications, deployment services, etc. to a potentially larger number of client computers. The clients or organizations can use these services or data to power a wide variety of workloads such as storage, data processing and warehousing, web and mobile applications, archive and many other tasks.

The computing system 200 may include a host device 202 communicatively coupled to a switch device 208. A first peripheral device 210 and a second peripheral device 212 may be connected, directly or indirectly, to the switch device 208. In some implementations, an optional first intermediary device 214 may reside between the first peripheral device 210 and the switch device 208, and an optional second intermediary device 216 may reside between the second peripheral 212 and the switch device 208. In some embodiments, the computing system 200 may use PCI as the interconnect between the first peripheral device 210 and the second peripheral device 212.

The host device 202 may include a host processor 204 and a host memory 206. The host processor 204 may be similar to the processor 102 and the host memory 206 may be similar to the memory 106, as discussed with reference to FIG. 1. In some embodiments, the root complex 104 may be integrated with the host processor 204. In some other embodiments, the root complex may be a discrete component.

The host device 202, switch device 208, first intermediary device 214, second intermediary device 216, first peripheral device 210 and the second peripheral device 212 may use one or more busses or a switching fabric for communication as discussed with reference to FIG. 1. For example, the switch device 208 may be similar to the switch 108, the first peripheral device 210 may be similar to the PCIe endpoint 110a and the second peripheral device 212 may be similar to the PCIe endpoint 110b. Even though the first peripheral device 210 and the second peripheral device 212 are configured to communicate via the switch device 208 in FIG. 2, it will be understood that other configurations are possible. For example, the first peripheral device 210 or the second peripheral device 212 may communicate via the bridge 114 or may directly be coupled to the root complex 104, as discussed with reference to FIG. 1.

The first intermediary device 214 or the second intermediary device 216 may be another switching device, a hub, an input/output (I/O) device, a connector device, or another suitable device that can communicate with the switch device 208 and the respective peripheral device. The first intermediary device 214 or the second intermediary device 216 may include hardware or software components. For example, the first intermediary device 214 or the second intermediary device 216 may be implemented using an FPGA, an integrated circuit, or any suitable circuit.

The first peripheral device 210 and the second peripheral device 212 may use a peer-to-peer communication system. For example, the first peripheral device 210 and the second peripheral device 212 can have access to each other's resources in the computing system 200. In one implementation, the first peripheral device 210 can send transactions to the switch device 208, which can then send the transactions to the second peripheral device 212. In this example, transactions need not be sent from the switch device 208 to the host processor 204, for the host processor 204 to then route the transaction to the correct recipient endpoint device. In some implementations, the first peripheral device 210 or the second peripheral device 212 may include a direct memory access (DMA) controller to perform data transfer for peer-to-peer communication. Some embodiments can provide access control for accesses from the DMA controller on the peripheral device.

In some instances, it may not be desirable to have access to all the resources of the second peripheral device 212 by the first peripheral device 210, or vice-versa. For example, the first peripheral device 210 may issue a request for a peer-to-peer transaction with the second peripheral device 212. The request may be for a write or a read transaction to access a function or a BAR associated with the second peripheral device 212. According to one embodiment, the first peripheral device 210 can include an access control mechanism to block or allow the request to go out of its port to communicate with the second peripheral device 212. For example, the first peripheral device 210 can perform access control by comparing one or more attributes of the transaction with the corresponding filter attributes stored in memory. For example, the attributes of the transaction may include an address, a type of the transaction, a quality of service (QoS) attribute, a tag, or any other attributes associated with the transaction. As an example, in one instance, the address of the transaction may be compared with one or more address ranges stored in the memory. The one or more address ranges may correspond to the function or the BAR associated with the second peripheral device 212 which may need protection from unauthorized access. In some embodiments, a combination of the attributes may be used to perform access control.

In some embodiments, an access control manager with higher privileges than the other components of the first peripheral device 210 can perform access control to allow or block the request to go out of the port of the first peripheral device 210. In one implementation, the access control manager may be a highly privileged administrative function. In some embodiments, the access control mechanism may be part of the switch device 208 to allow or block the request to go out of a port of the switch device 208 to the second peripheral device 212. In some embodiments, the access control mechanism may be part of the first intermediary device 214 to allow or block the request to go out of a port of the first intermediary device 214 to the second peripheral device 212 via the switch device 208. The first intermediary device 214 may implement the access control mechanism in hardware or software.

In some embodiments, the access control mechanism may be part of the second peripheral device 212 or the second intermediary device 216 to provide access control for a request initiated by the second peripheral device 212 for a peer-to-peer transaction with the first peripheral device 210. The second intermediary device 216 may implement the access control mechanism in hardware or software.

Figure 3:
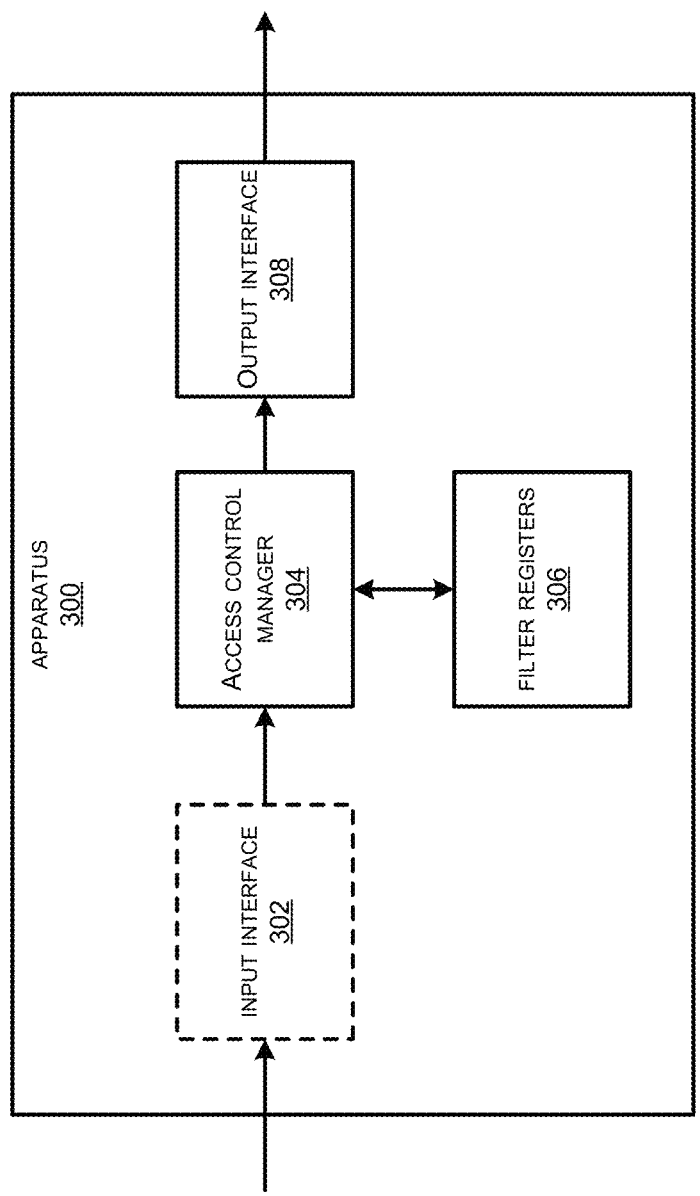
FIG. 3 illustrates an apparatus for providing access control in peer-to-peer communication, in one embodiment of the disclosed technologies.

FIG. 3 illustrates an apparatus 300 for providing access control for peer-to-peer transactions between a source peripheral device and a destination peripheral device, in one embodiment of the disclosed technologies. The apparatus 300 may include an input interface 302, an access control manager 304, filter registers 306 and an output interface 308. In some embodiments, one or more components of the apparatus 300 may be part of the first peripheral device 210, the second peripheral device 212, first intermediary device 214, second intermediary device 216 or the switch device 208.

The input interface 302 may be used for receiving a request for a peer-to-peer transaction between a source peripheral device and a destination peripheral device. The request for the transaction may be received by the apparatus 300 and may include a request to access a resource of a destination peripheral device. In one instance, the apparatus 300 may be part of the switch device 208. The request may be generated by the first peripheral device 210 to communicate with the second peripheral device 212 or vice-versa. In one instance, the apparatus 300 may be part of the first peripheral device 210. The first peripheral device 210 may be the source peripheral device and the second peripheral device 212 may be the destination peripheral device. In another instance, the apparatus 300 may be part of the second peripheral device 212. In this case, the second peripheral device 212 may be the source peripheral device and the first peripheral device 210 may be the destination peripheral device. In some implementations, the apparatus 300 may be part of the first intermediary device 214 or the second intermediary device 216.

The request may include a request for a write or a read transaction to access a register or memory of the destination peripheral device. In some embodiments, the request may be in the form of a packet, e.g., a transaction layer packet (TLP). The request may include one or more attributes associated with the transaction. The one or more attributes may depend upon the bus protocol used for the peer-to-peer communication. For example, for PCIe based communication, the one or more attributes may include an address, a type of the transaction, a QoS attribute, a tag, etc. In some implementations, the type of the transaction may include a memory write or a memory read transaction, an input/output (I/O) write or an I/O read transaction, a configuration write or a configuration read transaction, or a message request. The QoS attributes may include a traffic class, an application type, a user identifier, or any other suitable attributes to specify different priorities for different applications, users, or data flows. For example, the traffic class may specify a priority for processing and routing of the packets. The tag may identify an outstanding request for a requester of the transaction which requires a completion.

The filter registers 306 may be used for storing the filter attributes. For example, the filter attributes may include attributes that can be used to filter a request going out to the destination peripheral device based on a comparison of a single attribute or a combination of attributes. In some implementations, the filter attributes may include address ranges, types of transactions, QoS attributes, tags, etc., associated with the destination peripheral device that may be used to provide access control for the destination device. For example, in some instances, the filter registers 306 may store a type of transaction that needs to be blocked or allowed for a particular peripheral device. In some instances, a combination of an address and a type of the transaction can be used to filter a request. For example, a write transaction to a certain address in the destination peripheral device can be blocked or allowed by programming the appropriate filter attributes in the filter registers 306. Similarly, a request with a specific QoS attribute can be allowed or blocked to provide a particular quality of service. The tag attribute may be used to allow or block the request for completion of the transaction. In some implementations, various filter attributes in the filter registers 306 may be programmed at power up or during run time.

In some implementations, the filter registers 306 may store one or more address ranges. In one embodiment, an address range may include a first address and a second address. For example, the first address may include a higher value of the address range and the second address may include a lower value of the address range. In some implementations, a first portion of a filter register may store the first address and a second portion of the filter register may store the second address. As an example, for a 32-bit filter register, bits [31:16] can be used to store the first address and bits [15:0] can be used to store the second address. In some embodiments, the address range may include a base address and a size of the range or an offset. For example, in one implementation, a first filter register may store the base address and a second filter register may store the size or the offset. In another implementation, a first portion of a filter register may store the base address and a second portion of the filter register may store the size of the range. For example, for a 32-bit filter register, bits [31:16] can be used to store the base address and bits [15:0] can be used to store the size of the range. In some embodiments, the filter registers 306 may be used to store multiple address ranges for fine grained access control of different functions or different tenants associated with a peripheral device. In some embodiments, the filter registers 306 may include a base address register (BAR) associated with a peripheral device to which unauthorized access may be undesirable. The filter registers 306 may be implemented in software using memory. Some embodiments can allow programming the filter registers 306 with address ranges that need to be protected, thus providing fine grained access control without going through the host device 202.

The access control manager 304 may be used for controlling access to the destination peripheral device from the source peripheral device based on a comparison of one or more attributes associated with a transaction with the corresponding filter attributes stored in the filter registers 306. For example, the access control manager 304 may compare the address associated with the transaction for a request received by the input interface 302 with the one or more address ranges stored in the filter registers 306 to determine whether the request should be blocked or allowed to go out via a port of the source peripheral device to the destination peripheral device. In one embodiment, the request may be allowed to go out if the address of the request lies within the address range. In another embodiment, the request may be allowed to go out if the address of the request does not lie within the address range. Similarly, in one embodiment, the request may be blocked if the address of the request lies within the address range. In another embodiment, the request may be blocked if the address of the request does not lie within the address range. In some implementations, a decision to block or allow a request based on whether the address is within an address range or outside the address range may be stored in a configuration register. For example, the configuration register may be programmed by an administrative entity with higher privileges.

In some embodiments, the access control manager 304 may compare a combination of attributes associated with a transaction with corresponding filter attributes stored in the filter registers 306 to determine if the request can be blocked or allowed. For example, the access control manager 304 may compare any combination of a type of the transaction, an address, a QoS attribute, a tag with the corresponding filter attributes to determine if the request can be allowed or blocked. The access control manager 304 may include hardware or software components to perform the comparison. For example, in one implementation, the access control manager 304 may include one or more comparator circuits to compare the attribute associated with the transaction with the corresponding filter attribute. In some embodiments, an administrative entity with higher privileges can program a configuration register with a certain attribute type or combination that can be used for filtering. The type or the combination of the attributes that can be used for filtering can be different for different peripheral devices, tenants or functions.

The output interface 308 may be used for transmitting the transaction to the destination peripheral device via a port coupled to the apparatus 300 without transmitting the transaction to the host device 202. In some instances, the request can go out from the source peripheral device to the switch device 208 which can forward the request to the destination peripheral device. For example, in one implementation, the apparatus 300 may be part of the first peripheral device 210 and the output interface 308 may be used for transmitting the transaction to the second peripheral device 212 via a port of the first peripheral device 210 and through the switch device

208. In another implementation, the apparatus 300 may be part of the switch device 208 and the output interface 308 may be used for transmitting the transaction to the second peripheral device 212 via a port of the switch device 208 without transmitting the transaction to the host device 202.

Figure 4:
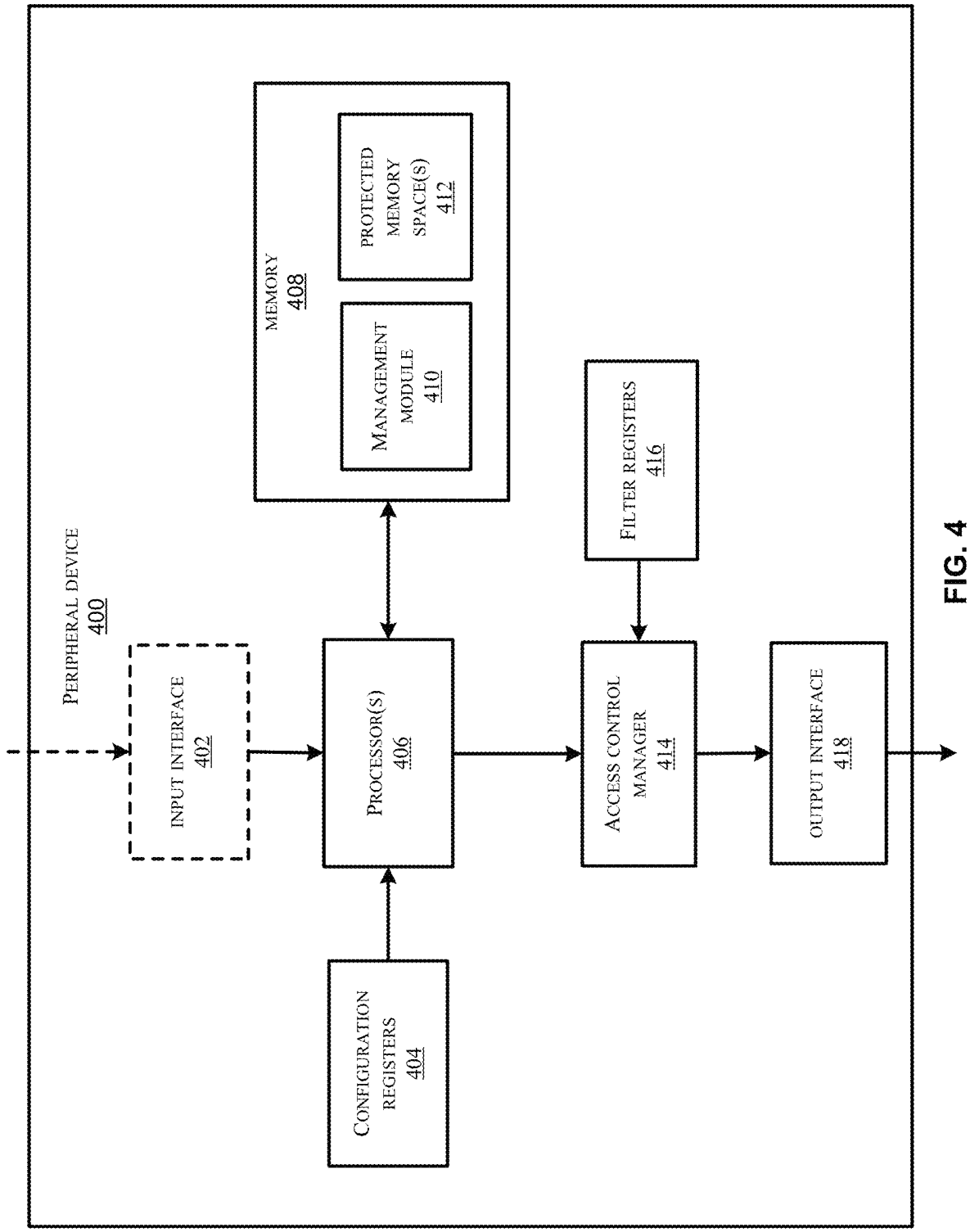
FIG. 4 illustrates a peripheral device comprising an access control mechanism for peer-to-peer communication, in one embodiment of the disclosed technologies.

FIG. 4 illustrates a peripheral device 400 comprising an access control mechanism for peer-to-peer communication, in one embodiment of the disclosed technologies. The peripheral device 400 may include an input interface 402, configuration registers 404, processor(s) 406, memory 408, an access control manager 414, filter registers 416 and an output interface 418. The peripheral device 400 may be the first peripheral device 210 or the second peripheral device 212 as discussed with reference to FIG. 2. In particular embodiments, the peripheral device 400 is an expansion card, such as a PCIe card.

The input interface 402 may be similar to the input interface 302 as discussed with reference to FIG. 3. For example, the input interface 402 may be used for receiving a request for a peer-to-peer transaction with another peripheral device. The request may be generated internally by the peripheral device 400 or derived from a transaction received from an external device. For example, in some embodiments, the input interface 402 and the output interface 418 may be part of a host interface (e.g., a PCIe interface) configured to communicate with the host device 202 directly or indirectly and the request may be derived from a transaction received via the host interface. In some implementations, the transaction may be received from the host device 202 via the switch device 208. The request may include one or more attributes associated with the transaction, e.g., an address, a type of the transaction, QoS attributes, a tag, etc.

The configuration registers 404 may include a plurality of registers that may be implemented in hardware or software. For example, the configuration registers 404 may include an access control configuration register, PCI express configuration space registers or any other suitable registers that may be needed to implement the functionality of the peripheral device 400. In some embodiments, the access control configuration register may include one or more fields to enable peer-to-peer communication with one or more peripheral devices communicatively coupled to the peripheral device 400. The access control configuration register may also include various configurations for performing access control. For example, a first configuration may be used to allow a request if the address of the request lies within an address range and a second configuration may be used to allow a request if the address of the request lies outside an address range, and a third configuration may be used to redirect a request to another peripheral device. In some embodiments, the access control configuration register may allow various configurations for different combinations of transaction attributes that can be compared to provide access control.

The processor(s) 406 may include one or more processors. The processors 404 may be general purpose computing devices such as are manufactured by Intel®, AMD® ARM®, Qualcomm®, an others. The processors 406 may be configured to execute instructions stored in a non-transitory computer readable medium. The non-transitory computer readable medium may be in the form of a memory. In some embodiments, the non-transitory computer readable medium may be part of the memory 408.

The memory 408 may include Dynamic Random Access Memory (DRAM), Synchronous DRAM (SDRAM), and/or Double Data Rate (DDR), among others. In some cases, the memory 408 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. The memory 408 may include a management module 410 and protected memory space(s) 412.

The management module 410 may include instructions to provide management of various hardware and software components of the peripheral device 400. In some embodiments, the management module 410 may configure various registers at power up. For example, the management module 410 may configure the filter registers 416 with the necessary address ranges needed to perform access control. The management module 410 may also write to the access control configuration register in the configuration registers 404 to enable peer-to-peer communication with a specific peripheral device after programming the filter registers.

The protected memory space(s) 412 may include memory space that may be associated with a function or a tenant to which unauthorized access by other peripheral devices or other tenants may not be desirable. In some embodiments, the protected memory space(s) 412 may include addressable memory corresponding to a function.

The access control manager 414 and the filter registers 416 may be similar to the access control manager 304 and the filter registers 306 as discussed with reference to FIG. 3. The access control manager 414 may be used for allowing or blocking a request to go out of a port of the peripheral device 400 based on a comparison of one or more attributes associated with the transaction for the request with one or more corresponding filter attributes programmed in the filter registers 416. In some embodiments, the access control manager 414 may perform the address comparison to redirect a request to another peripheral device. The access control manager 414 and the filter registers 416 may be implemented in hardware, software, or a combination of the two. For example, in some embodiments, the access control manager 414 or the filter registers 416 may be part of the memory 408.

The output interface 418 may be similar to the output interface 308 as discussed with reference to FIG. 3. The output interface 418 may be used to facilitate transmission of the transaction to a peer peripheral device directly or indirectly. For example, if the request is allowed by the access control manager 414, the request can go out via a port of the peripheral device 400 to the destination peripheral device. In some implementations, the peripheral device 400 may use a DMA controller (not shown) for data transfer with another peer. Some embodiments can allow or block the accesses from the DMA controller based on the comparison of the one or more attributes.

Figure 5:
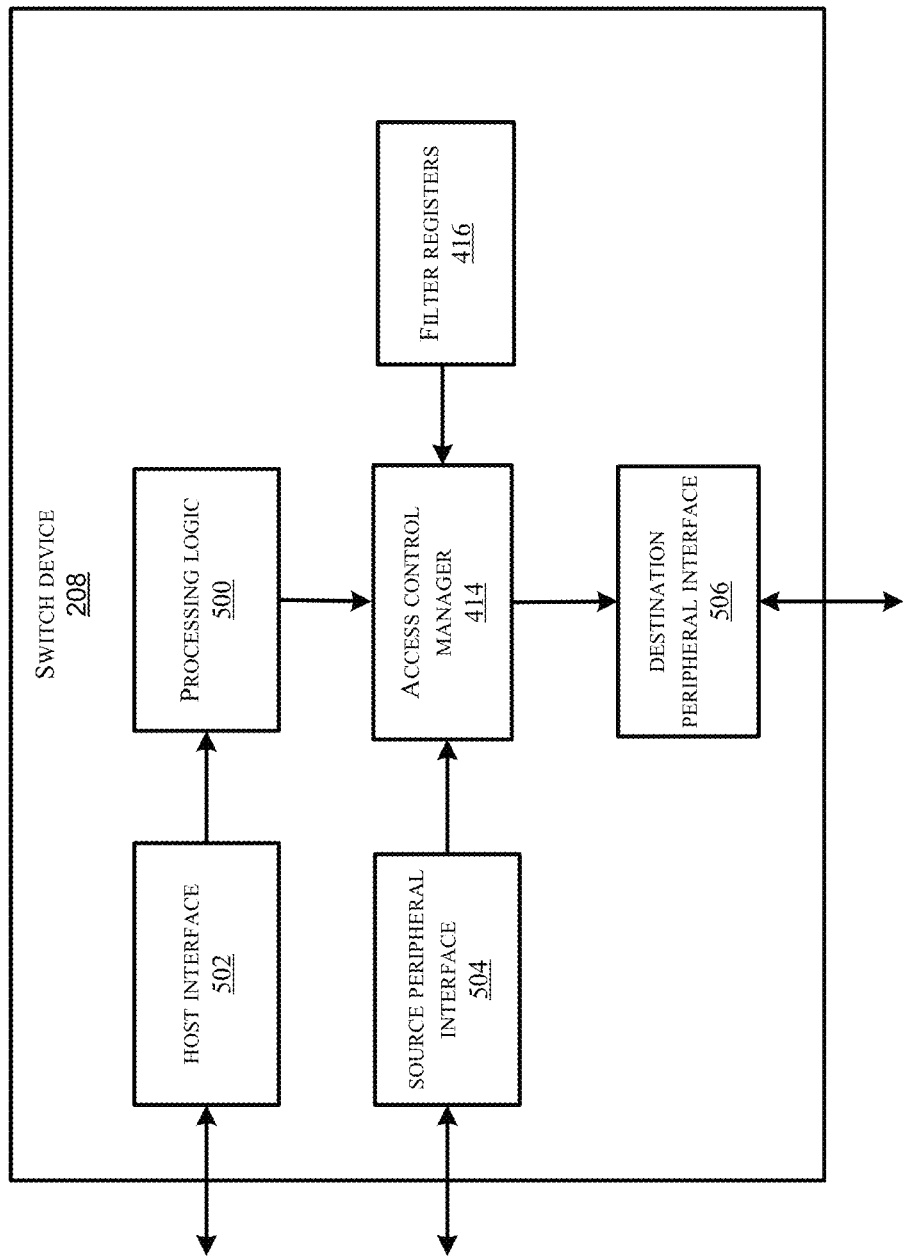
FIG. 5 illustrates a switch device implementing the access control mechanism, in one embodiment of the disclosed technologies.

FIG. 5 illustrates the switch device 208 implementing the access control mechanism, in one embodiment of the disclosed technologies. The switch device 208 may include processing logic 500, a host interface 502, a source peripheral interface 504, the access control manager 414, filter registers 416 and a destination peripheral interface 506. Note that the switch device 208 may include multiple ports which are not shown here for the purposes of simplicity. For example, some ports may be used for upstream traffic and some other ports may be used for downstream traffic.

The host interface 502 may be used to communicate with the host device 202. For example, the host interface 502 may include a PCI express interface.

The processing logic 500 may include hardware or software components to implement the functionality of the switch device 208. For example, the processing logic 500 may include one or more processing cores, memory, control logic or any other suitable components.

The source peripheral interface 504 may be used to communicate with the source peripheral device. For example, the source peripheral device may be the first peripheral device 210 or the second peripheral device 212. In some embodiments, the source peripheral interface 504 may include the functionality of the input interface 402. For example, the source peripheral interface 504 may receive a request for a peer-to-peer transaction between the source peripheral device and the destination peripheral device. In some embodiments, the host interface 502, source peripheral interface 504 and the destination peripheral interface 506 may be part of a PCI express switching fabric as discussed with reference to FIG. 1.

The destination peripheral interface 506 may be used to communicate with the destination peripheral device. For example, the destination peripheral device may be the first peripheral device 210 or the second peripheral device 212. In some embodiments, the destination peripheral interface 506 may include the functionality of the output interface 418. For example, the destination peripheral interface 506 may be used for facilitating communication with the second peripheral device 212 via a port of the switch device 208 (not shown) without going through the host device 202.

The access control manager 414 and the filter registers 416 can provide fine grain access control for accesses to certain functions or protected memory sections of a peripheral device coupled to the switch device 208 without going through the host device 202. As discussed with reference to FIG. 4, the access control manager 414 or the filter registers 416 can be implemented in hardware, software, or a combination thereof. In some embodiments, access control can be provided for each port of the switch device 208 that is coupled to a peripheral device. For example, in one implementation, a separate set of the access control manager 414 and the filter registers 416 can be used to provide access control for each port of the switch device 208. In another implementation, filter attributes associated with each port can be stored in a central memory or filter registers.

Figure 6:
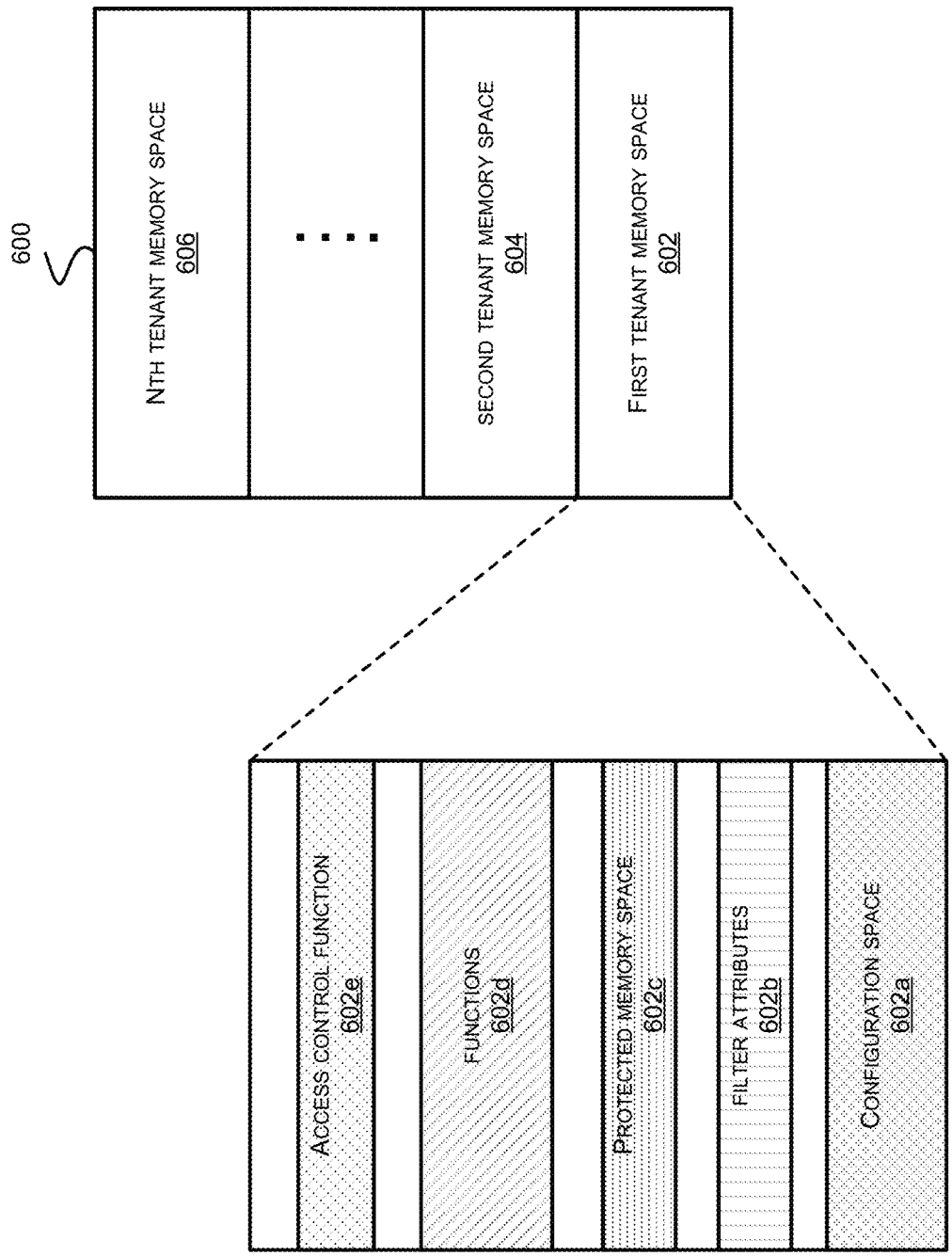
FIG. 6 illustrates a memory map for a peripheral device, in one embodiment of the disclosed technologies.

FIG. 6 illustrates a memory map 600 for a peripheral device, in one embodiment of the disclosed technologies.

The memory map 600 may be associated with the first peripheral device 210 or the second peripheral device 212. For example, an address space of the host processor 204 can contain a memory map for the memory of the first peripheral device 210 or the second peripheral device 212.

In some embodiments, the memory map 600 may include memory maps for multiple tenants in a multi-tenant environment. For example, a first tenant memory space 602 may be associated with a first tenant, a second tenant memory space 604 may be associated with a second tenant, and an Nth tenant memory space 606 may be associated with an Nth tenant. It will be understood that the memory space for each tenant may vary in size and its contents.

In some embodiments, the first tenant memory space 602 may include a configuration space 602a, filter attributes 602b, protected memory space 602c, functions 602d and an access control function 602e. The configuration space 602a may include PCI express configuration space registers. The filter attributes 602b may store the filter attributes associated with a peripheral device for the first tenant which can be used to compare with the attributes associated with a transaction to provide access control for peer-to-peer transactions with that peripheral device. For example, the filter attributes 602b may be similar to the filter attributes stored in the filter registers 416 or the filter registers 306. In some implementations, the filter attributes 602b may include address ranges, types of a transaction, QoS attributes (e.g., traffic class), tags, etc., associated with the peripheral device. The protected memory space 602c may include memory space to which unauthorized access may not be desirable by another tenant or another source peripheral device. The functions 602d may include software code for device functions implemented by the source peripheral device. The access control function 602e may include software code to implement the functionality of the access control manager 414 in one embodiment. The access control function 602e may include higher privileges and may be an administrative function. It will be noted that different components of the first tenant memory space 602 may vary in size and order and can be overlapped or combined.

Figure 7:
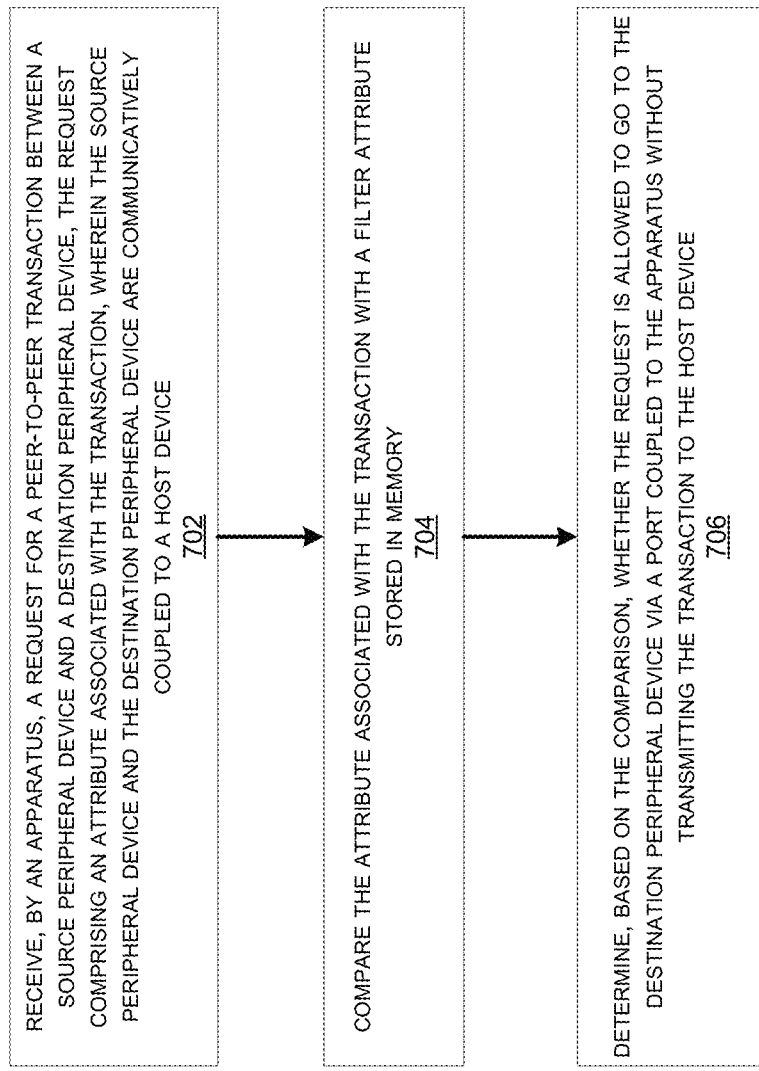
FIG. 7 illustrates a computer-implemented method for controlling communication between peripheral devices in a computing system, in one embodiment of the disclosed technologies.

FIG. 7 illustrates a computer-implemented method for controlling communication between peripheral devices in a computing system, in one embodiment of the disclosed technologies. For example, the computing system may be similar to the compute system 200 of FIG. 2.

In step 702, an apparatus may receive a request for a peer-to-peer transaction between a source peripheral device and a destination peripheral device. The request can include an attribute associated with the transaction, e.g., an address, a type of the transaction, a traffic class or a tag. Referring back to FIG. 2, an apparatus may receive a request for a peer-to-peer transaction between the first peripheral device 210 and the second peripheral device 212. For example, the first peripheral device 210 can be the source peripheral device and the second peripheral device 212 can be the destination device. The apparatus may be apparatus 300 that can be part of the first peripheral device 210 or the switch device 208. The request may include a request for a write transaction or a read transaction to access a resource on the second peripheral device 212 identified by the type and address of the transaction. The first peripheral device 210 and the second peripheral device 212 may be coupled to the host device 202 via the switch device 208.

In step 704, the attribute associated with the transaction can be compared with a filter attribute stored in memory. Referring back to FIG. 3, the access control manager 304 can compare the attribute associated with the transaction with the filter attribute stored in the filter registers 306. The filter registers 306 can be programmed at power up before enabling the peer-to-peer communication. The filter registers 306 can be associated with a tenant in a multi-tenant environment as discussed with reference to FIG. 6. In some implementations, the filter attributes may be the filter attributes 602b for a first tenant as discussed with reference to the memory map 600 of FIG. 6. For example, the memory map 600 may be associated with the first peripheral device 210.

In step 706, based on the comparison, it can be determined if the request is allowed to go to the destination peripheral device via a port coupled to the apparatus without transmitting the transaction to the host device. The access control manager 304 can determine based on the comparison if the request is allowed to go out via a port of the first peripheral device 210. For example, in one embodiment, the request can go out if the address lies within the address range. In another embodiment, the request can go out if the address does not lie within the address range. The output interface 418 can be used to transmit the transaction to the second peripheral device via the port of the first peripheral device 210 without transmitting the transaction to the host device 202.

Embodiments of the disclosed technologies can provide access control, including fine grained access control, at the source peripheral device to allow or block a request for a transaction with a destination peripheral device based on an attribute associated with the transaction. The access control for peer-to-peer communications can be provided without going through the host device. Thus, the embodiments can prevent unauthorized accesses to functions, BARs or protected memory spaces associated with a peripheral device without adversely affecting the host traffic. Some embodiments can provide access control for each tenant in a multi-tenant environment by configuring different filter attributes, e.g., address ranges, types of transactions, QoS attributes, etc., for different tenants.

Figure 8:
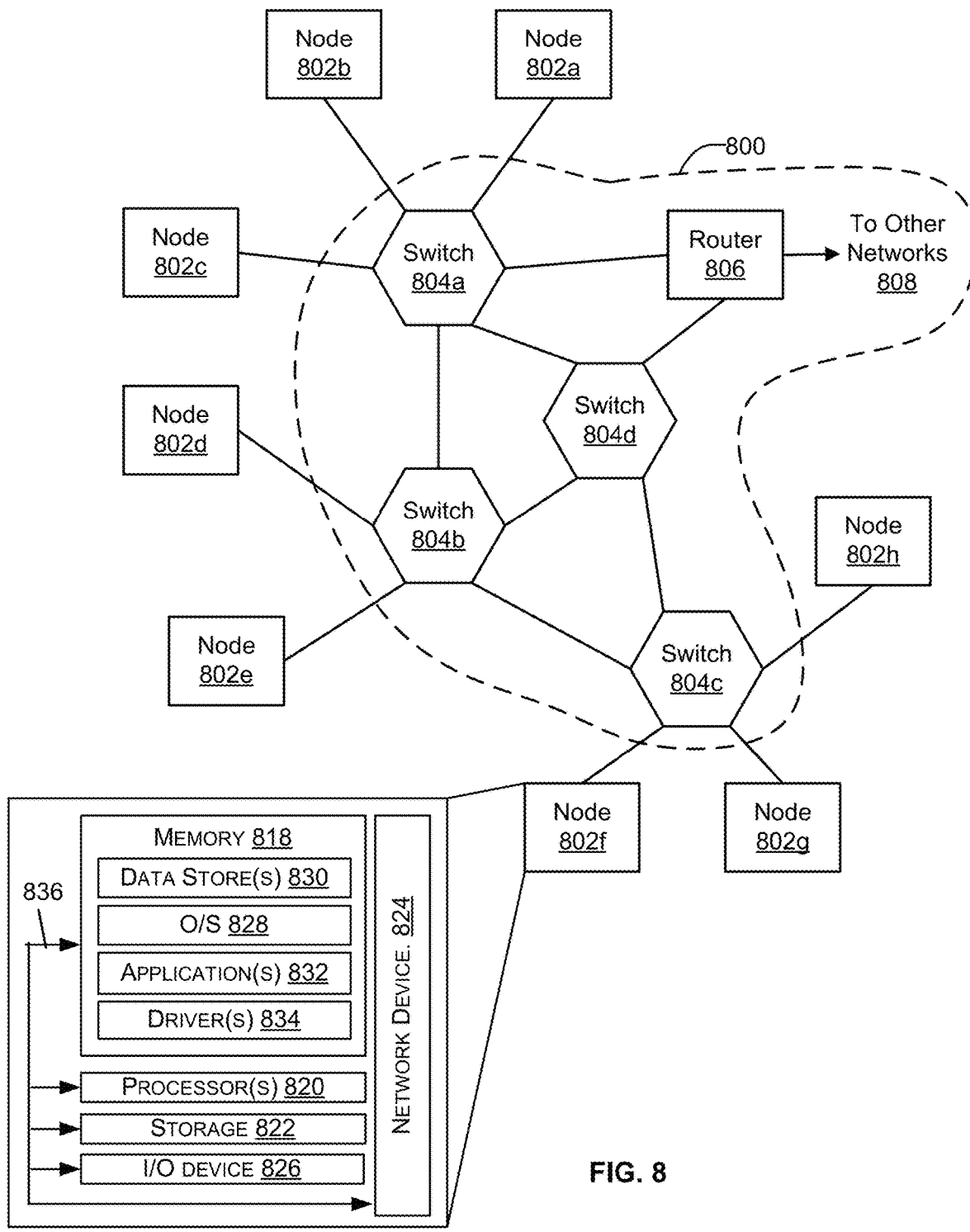
FIG. 8 illustrates an example architecture for features and systems described herein that include one or more service provider computers and/or a user device connected via one or more networks, according to certain aspects of the disclosure.

FIG. 8 illustrates a network 800, illustrating various different types of devices such as nodes, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers. In some implementations, one or more of the nodes 802a-802h may include the computing system 200 of FIG. 2. In some implementations, one or more of the nodes 802a-802h may include some components or features of the apparatus 300. In some implementations, one or more of the nodes 802a-802h may include some components or features of the peripheral device 400.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. Examples of hardware processor(s) 820 may include processors developed by ARM®, MIPS®, AMD®, Qualcomm®, and the like. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared. In some implementations, the memory map 600 may be mapped to an address space of the hardware processor 820, as discussed with reference to FIG. 6.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802*a*-802*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802*a*-802*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802*a*-802*h* may also include I/O device(s) 826, such as a keyboard, a mouse, a pen, a voice input device, a touch input device, a display, speakers, a printer, and the like. The node(s) 802*a*-802*h* may also include one or more communication channels 836. A communication channel 836 may provide a medium over which the various components of the node(s) 802*a*-802*h* can communicate. The communication channel or channels 836 may take the form of a bus, a ring, a switching fabric, or a network.

The node(s) 802*a*-802*h* may also contain network device(s) 824 that allow the node(s) 802*a*-802*h* to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for controlling communication between peripheral devices in a computing system, the method comprising:
   receiving, by an apparatus within a source peripheral device, a request for a peer-to-peer transaction between the source peripheral device and a destination peripheral device, the request comprising an attribute associated with the transaction, wherein the attribute includes a type of transaction and a QoS attribute, wherein the source peripheral device and the destination peripheral device are communicatively coupled to a host device via a switch device using respective peripheral component interconnect (PCI) express interfaces;
   comparing the attribute associated with the transaction with a filter attribute stored in memory of the apparatus, wherein the filter attribute includes types of transactions and QoS attributes;
   determining, based on the comparison, whether the request is allowed to go to the destination peripheral device via a port coupled to the apparatus without transmitting the transaction to the host device; and in response to determining, based on the comparison, that the attribute corresponds to the filter attribute, transmitting the transaction to the destination peripheral device via the port without transmitting the transaction to the host device, wherein the request is allowed to go via the port if the type of transaction is included in the types of transactions and the QoS attribute is included in the QoS attributes.

2. The computer-implemented method of claim 1, wherein the attribute associated with the transaction includes an address and the filter attribute includes an address range.

3. The computer-implemented method of claim 2, wherein the request is allowed to go via the port if the address lies within the address range.

4. The computer-implemented method of claim 2, wherein the request is not allowed to go out via the port if the address lies within the address range.

5. An apparatus comprising:
an input interface for receiving a request by the apparatus for a peer-to-peer transaction between a source peripheral device and a destination peripheral device, the source peripheral device and the destination peripheral device communicatively coupled to a host device, the request comprising an attribute associated with the transaction, wherein the attribute includes a type of transaction and a QoS attribute, wherein the apparatus is part of the source peripheral device, and wherein the source peripheral device is coupled to the destination peripheral device through a switch device;
memory for storing a filter attribute associated with the destination peripheral device, wherein the filter attribute includes types of transactions and QoS attributes;
an access control manager for controlling access to the destination peripheral device for the peer-to-peer transaction based on a comparison of the attribute associated with the transaction with the filter attribute stored in the memory; and
an output interface for transmitting the transaction to the destination peripheral device via a port coupled to the apparatus without transmitting the transaction to the host device;
wherein the apparatus is configured to transmit the transaction to the destination peripheral device via the port without transmitting the transaction to the host device in response to determining, based on the comparison, that the attribute corresponds to the filter attribute, wherein the request is allowed to go via the port if the type of transaction is included in the types of transactions and the QoS attribute is included in the QoS attributes.

6. The apparatus of claim 5, wherein the attribute associated with the transaction includes an address and the filter attribute includes an address range.

7. The apparatus of claim 6, wherein controlling the access includes allowing the access to the destination peripheral device for the peer-to-peer transaction if the address lies within the address range.

8. The apparatus of claim 6, wherein controlling the access includes blocking the access to the destination peripheral device for the peer-to-peer transaction if the address lies within the address range.

9. The apparatus of claim 5, wherein the memory includes a register and wherein the filter attribute associated with the destination peripheral device is stored in the register.

10. The apparatus of claim 5, wherein the filter attribute is a first filter attribute associated with a first tenant from a plurality of tenants for the source peripheral device, and wherein the memory further stores a second filter attribute associated with a second tenant from the plurality of tenants.

11. The apparatus of claim 5, wherein the filter attribute is a first filter attribute associated with a first function, and wherein the memory further stores a second filter attribute associated with a second function.

12. The apparatus of claim 5, wherein the source peripheral device and the destination peripheral device are communicatively coupled to the host device using a respective peripheral component interconnect (PCI) express interface.

13. The apparatus of claim 12, wherein the filter attribute is stored in a PCI express configuration space associated with the source peripheral device.

14. The apparatus of claim 5, wherein the source peripheral device is memory mapped in an address space of the host device.

15. The apparatus of claim 14, wherein the memory for storing the filter attribute corresponds to the address space associated with the source peripheral device.

16. The apparatus of claim 5, wherein the access control manager includes a comparator circuit to compare the attribute associated with the transaction with the filter attribute stored in the memory.

17. The apparatus of claim 5, wherein the attribute includes an address, a type of the transaction, a quality of service attribute, or a tag.

18. A system comprising:
a first peripheral device communicatively coupled to a host device;
a second peripheral device communicatively coupled to the host device, wherein:
the first peripheral device comprises a first apparatus to allow or block a first request to go via a first port of the first peripheral device for a first peer-to-peer transaction with the second peripheral device without transmitting the first transaction to the host device, wherein the first peripheral device comprises memory for storing a filter attribute associated with the second peripheral device, wherein the filter attribute includes types of transactions and QoS attributes; and
the second peripheral device comprises a second apparatus to allow or block a second request to go out via a second port of the second peripheral device for a second peer-to-peer transaction with the first peripheral device without transmitting the second transaction to the host device;
an input interface for receiving the first request for the first peer-to-peer transaction with the second peripheral device, the first request comprising an attribute associated with the first transaction, wherein the attribute includes a type of transaction and a QoS attribute; and
an access control manager for comparing the attribute associated with the first transaction with the filter attribute stored in the memory to allow or block the first request;
wherein the first peripheral device is configured to transmit the first transaction to the second peripheral device via the first port without transmitting the first transaction to the host device in response to determining, based on the comparison, that the attribute corresponds to the filter attribute, wherein the request is allowed to go via the port if the type of transaction is included in the types of transactions and the QoS attribute is included in the QoS attributes.

19. The system of claim 18, wherein the first apparatus includes:
   an output interface for transmitting the first transaction to the second peripheral device via the first port of the first peripheral device.

\* \* \* \* \*